April 30, 1935.  J. L. ANDERSON  1,999,853
TRACING DEVICE
Filed Nov. 17, 1932   2 Sheets-Sheet 1
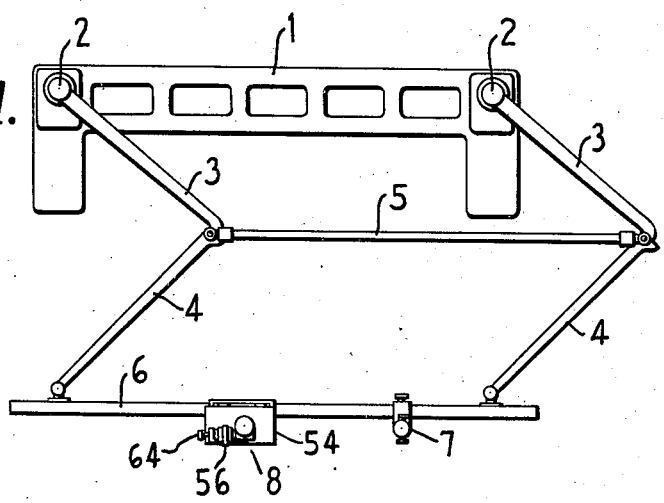
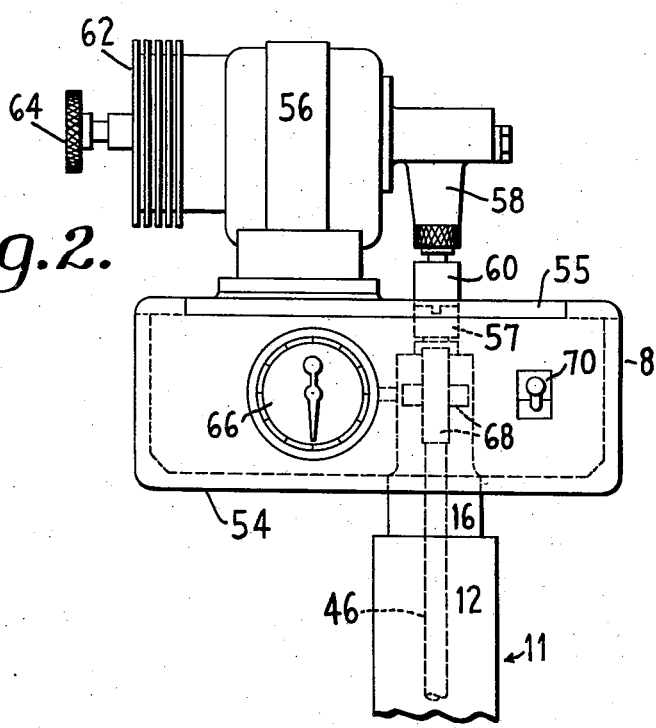
INVENTOR
James L. Anderson
BY
ATTORNEY April 30, 1935.  J. L. ANDERSON  1,999,853
TRACING DEVICE
Filed Nov. 17, 1932    2 Sheets-Sheet 2
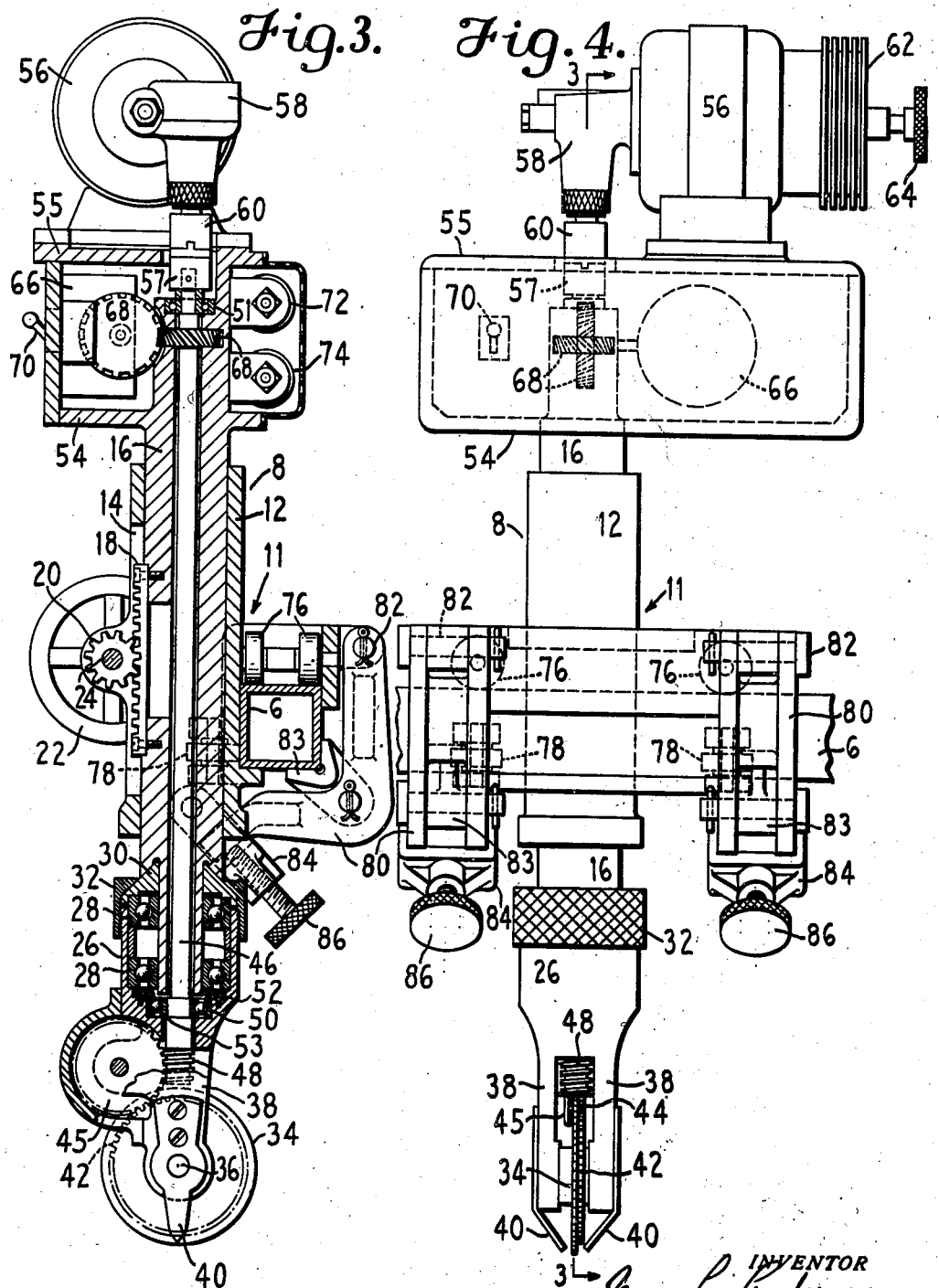

Patented Apr. 30, 1935

1,999,853

UNITED STATES PATENT OFFICE 1,999,853

TRACING DEVICE

James L. Anderson, Closter, N. J., assignor to Air Reduction Company, Incorporated, New York, N. Y., a corporation of New York Application November 17, 1932, Serial No. 643,068

9 Claims. (Cl. 266—23)

This invention relates to tracing devices, and particularly to apparatus for guiding a torch of a universal cutting or welding machine.

Tracing devices for moving a universally supported torch in accordance with the outline of a drawing include a motor driven wheel which runs on the surface of the drawing, and a holder for the wheel swivelly connected to the other portion of the tracer so that it can be turned to steer the tracer wheel. The wheel holder is usually movable also in a direction at right angles to the plane of the drawing so that the wheel can be raised out of contact with the drawing. If the wheel holder is free to move toward and from the drawing during the operation of the tracing device, the wheel can travel over its horizontal supporting surface with uniform load and traction, and without imparting vertical movement to the universal supporting frame, when there are irregularities in the supporting surface.

It is an object of this invention to provide an improved tracing device of the type indicated, and to eliminate certain parts formerly considered necessary in such a tracing device, and to obtain a construction requiring less machine work to manufacture and permitting substantially greater tolerances in the machine work. These features make the tracing device more rugged and reliable, and materially reduce the cost of manufacture.

Another object of the invention is to combine a speed indicator with a tracing device of the type having a governor for controlling the motor speed and means for raising the tracer wheel out of contact with the drawing or other traction surface. The speed with which the tracer travels over a drawing determines the speed with which the torch moves over the surface of the work. When making a cut on a plate of a given thickness, the operator will control the motor speed to obtain a definite cutting speed for the torch, the proper speed for different thicknesses and grades of work being given by a chart or table. The speed indicator on the tracer has the important advantage of indicating the rate of travel before the wheel is brought into contact with the drawing, or other traction surface, or as soon as the motor comes up to speed, and the time loss and inconvenience of making trial runs are avoided.

Other objects, features and advantages of the invention will appear or be pointed out as the specification proceeds.

In the accompanying drawings forming a part hereof:

Fig. 1 is a top plan view of a universal cutting machine equipped with a torch and a tracing device made in accordance with this invention;

Fig. 2 is a fragmentary front elevation on an enlarged scale, showing the upper part of the tracing device;

Fig. 3 is a sectional view of the tracer, the section being taken on the line 3—3 of Fig. 4, but showing the motor switch in elevation; and Fig. 4 is a rear elevation of the tracing device shown in Fig. 3.

A base 1 supports columns 2. An arm 3 is pivotally connected to each column. Other arms 4 are pivotally connected to the arms 3, and the pivot points between the arms are connected by a rod 5. A bar 6 is pivoted to the arms 4, and this bar provides a support for a torch 7 which is universally movable in a plane. A tracer, designated as a whole by the reference character 8, is connected to the bar 6, and any movement of the tracer causes the torch to execute a similar movement because the bar 6 always moves parallel to itself.

A clamp fitting or bracket 11, shown in Fig. 3, has a vertical tubular bearing 12 with a slot 14 through the front of the bearing.

The tracer device includes a sleeve 16, which is slidable vertically in the tubular bearing 12, and has a rack 18 extending into the slot 14. This rack prevents turning of the sleeve 16 in the tubular bearing, but the rack is shorter than the slot 14 so that the sleeve can move with a free vertical floating movement within a limited range. A pinion 20 engages the rack 18 and is rotated by a hand-wheel 22, to raise the sleeve 16 when the tracer is to be lifted from the drawing. The pinion 20 and hand-wheel 22 are fixed to a shaft 24, which rotates freely in bearings carried by the vertical tubular bearing member 12 so that the pinion and hand-wheel oscillate freely and do not interfere with the free floating movement of the sleeve 16.

A tracer holder 26 is swivelly connected to the lower end of the sleeve 16, and the outside of the sleeve provides the bearing about which the tracer holder 26 swivels. In the form of the invention shown in the drawing, ball bearings 28 are located between the sleeve 16 and the tracer holder 26. A tapered collar 30, on the outside of the sleeve 16, is connected to the tracer holder 26 by a nut 32, having a tapered inside wall which fits over the collar 30. The outside of the nut 32 is knurled and serves as a grip for turning the tracer holder to steer the trace along an outline of a template or drawing.

A tracer wheel 34 is carried by a horizontal axle 36, which is held by side members 38 of the tracer holder. The wheel 34 runs on a pattern or drawing and supports the tracer holder 26, sleeve 16, and other parts of the tracer device. A pointer 40 is attached to each of the side members 38, and terminates close to the point of contact of the wheel 34 on the template or drawing to facilitate the guiding of the wheel along an outline.

A gear 42 is connected with the tracer wheel 34 and meshes with a driving gear 44. A worm wheel 45 operates the gear 44. A driving shaft 46 extends vertically through the sleeve 16, with the axis of the shaft coincident with the axis of the sleeve. A worm gear 48 at the lower end of the shaft 46 drives the worm wheel 45. The shaft 46 runs in bearings 50 and 51 in the tracer holder and upper end of the sleeve 16, respectively. In the drawing, ball bearings are used for the shaft, but other types of bearings can be used.

The bearing 50 fits into a recess in the tracer holder and is held securely in position by a washer 52 which is connected to the tracer holder by screws, as shown in Fig. 3. The shaft 46 immediately below the bearing 50 is of increased diameter to provide a shoulder 53 which thrusts against the bearing 50, and this shoulder 53 holds the tracer holder on the sleeve with the tapered face of the collar 30 in contact with a complemental face on the sleeve. The friction of these tapered faces prevents the tracer holder from swivelling too easily so that it is likely to be turned by friction of the worm gear 48 driving the worm wheel 45.

The upper end of the shaft 46 is pinned to a flange 57 which thrusts against the side of the bearing 51 and holds the shaft 46 against moving downwardly.

A box 54 is carried by the upper end of the sleeve 16 and the top wall of the box is a platform 55 on which a motor 56 is mounted. The motor is operatively connected to the shaft 46 through reduction gearing 58 and a coupling 60. The speed of the motor, and consequently the speed of translation of the tracer, is controlled by a governor 62 of conventional design. The governor is regulated by the usual screw adjustment 64.

A speed indicator 66 is set in the front wall of the box 54. The speed indicator is driven from the shaft 46 through gears 68, and is graduated to indicate the speed of translation of the tracer wheel over the template or drawing, or the speed of the torch across the work. A switch 70, for controlling the supply of power to the motor, is carried by the front wall of the box.

The box 54 also serves as a housing for other equipment in the motor circuit, such as resistance coils 72 and 74, which are connected in the switch and governor circuits in the usual manner.

The clamp fitting or bracket 11 clamps on the bar 6. The bracket 11 has rollers 76 contacting with the top surface of the bar 6, and rollers 78 contacting with the side of the bar. Curved arms 80 are pivotally connected to the bracket 11 by pins 82. Clamping jaws 83 are oscillatably connected to the arms 80 and bear against the back and bottom sides of the bar 6. The forward ends of the arms 80 fit into yokes 84, and the arms are held in clamping position by screws 86 threading through the ends of the yokes.

When the tracing device is to be clamped in a different position along the bar 6, the screws 86 are released so that the arms 80 are free to slide on the bar. The rollers 76 and 78 provide anti-friction means which cause the tracing device to slide easily along the bar, the weight of the tracer being carried by the rollers 76, and the side thrust against the front of the bar being carried by the rollers 78.

The single sleeve 16 with its floating connection to the clamp fitting or bracket 11, and the construction connecting the tracer holder 26 to the floating sleeve, is a simplified and improved design over previously known tracers. The control box 54 carried on the upper end of the floating sleeve provides a convenient housing for a switch, speed indicator, and resistance coils. The motor, control box, and parts carried by the control box can be rigidly connected to the clamp fitting or bracket 11, and the swivel portion designed to float with respect to the clamp fitting. Other changes can be made in the embodiment of the invention illustrated, and various features of the invention can be used alone or in combination with other features without departing from the invention as defined in the appended claims.

I claim:

1. A tracing device for a universal torch machine comprising a fitting for connection to the frame of the machine; a vertical bearing rigidly connected to the fitting; a single sleeve extending through the vertical bearing and slidable in said bearing for floating movement; a tracer wheel and holder swivelly connected with the lower end of the sleeve; a motor at the upper end of the sleeve; driving connections between the motor and the tracer wheel including a vertical shaft in the sleeve; and a bearing for the shaft at the lower end of said sleeve.

2. A tracing device comprising a bracket for connection with the movable frame of a universal torch machine; a vertical bearing in the bracket; a sleeve slidably held by the vertical bearing; and a tracer wheel and holder connected with the lower end of the sleeve, and movable vertically as a unit with the sleeve so that the tracing device has a floating movement as it travels over an uneven supporting surface, said holder extending outside of said sleeve and over the lower portions only of said sleeve.

3. A tracing device comprising a bracket for connection with the movable frame of a universal torch machine; a vertical bearing in the bracket; a sleeve movable axially in the vertical bearing; a tracer holder swivelly connected to the lower part of the sleeve, with the swivel bearing outside of the sleeve and entirely below the vertical bearing; a tracer wheel connected with the holder; and mechanism for driving the wheel.

4. A tracing device comprising a bracket for connection with the movable frame of a universal torch machine; a vertical bearing in the bracket; a sleeve movable axially in the vertical bearing; a tracer holder swivelly connected to the lower part of the sleeve, with a swivel bearing confined to the lower part of the sleeve; a tracer wheel connected with the holder; a motor carried by the upper end of the sleeve; and driving connections between the motor and the wheel, including a vertical shaft extending through the sleeve.

5. A tracing device for universal torch machines, comprising a bracket for connecting the tracing device to the frame of the machine; a tracer wheel for moving the tracing device along an outline of a pattern or drawing; means for raising and lowering the tracing device to move the tracer wheel into and out of contact with the pattern or drawing; a motor carried by the tracing device; an adjustable governor on the motor; driving connections between the motor and the tracer wheel; and a speed indicator carried by the tracing device and operatively connected with said driving connections.

6. A tracing device for a universal torch machine comprising a bracket for connecting the tracing device to the frame of the machine; a vertical bearing in the bracket; a non-swivel portion vertically movable in the bearing; a rack connected to said non-swivel portion and serving as a key to prevent turning of the non-swivel portion in said vertical bearing; a manually operated pinion for moving the rack to raise or lower said non-swivel portion of the tracing device; a swivel portion connected to and wholly at the lower end of the non-swivel portion; a tracer wheel on the swivel portion; means for turning the swivel portion to steer the wheel; and a motor for driving the tracer wheel.

7. A tracing device for a universal torch machine comprising a bracket for connection with the frame of the machine; a single sleeve extending through the bracket and having a vertical floating movement in the bracket; a swivel portion connected to the lower end of the sleeve and located entirely below the supporting bracket; a tracer wheel on the swivel portion; and power operating mechanism for the tracer wheel.

8. A tracing device for a universal torch machine comprising a bracket for connection with the machine; a vertical bearing in the bracket; a sleeve slidable lengthwise in the bearing for floating movement toward and from the work; means to prevent the sleeve from turning in said bearing; a driving wheel for running on a pattern or drawing; a holder for the driving wheel; and means connecting the holder to the sleeve including bearings, confined to the lower half of the sleeve, on which the holder swivels to turn the driving wheel to run in any and changing directions on the pattern or drawing.

9. A tracing device comprising a bracket for attaching to a supporting frame which has universal movement in a plane, a non-swivel portion carried by the bracket and movable with respect to said bracket substantially normal to the plane of movement of the supporting frame, a swivel portion connected to and wholly at the lower end of said non-swivel portion, a tracer wheel connected with the swivel portion, and mechanism for rotating the tracer wheel to drive it in any and changing directions across a surface substantially parallel to the plane of movement of the supporting frame.

JAMES L. ANDERSON.